Dec. 6, 1960 O. R. SEIDNER 2,962,934
VEHICLE PROPULSION APPARATUS
Filed June 13, 1955 2 Sheets-Sheet 1
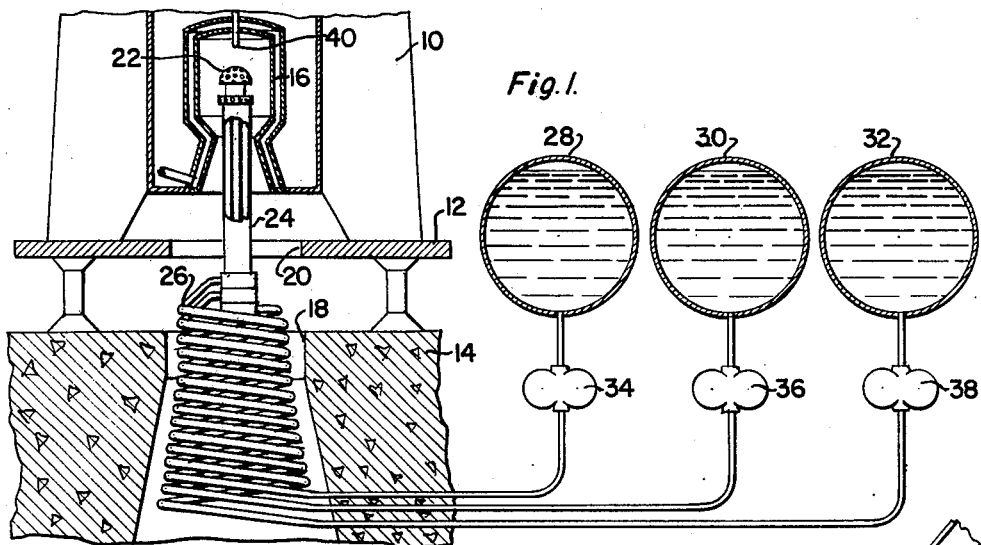
Fig. 1.
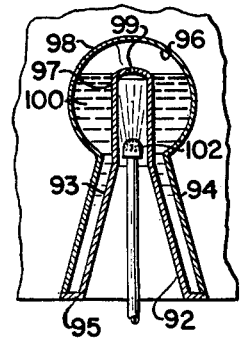
Fig. 2.
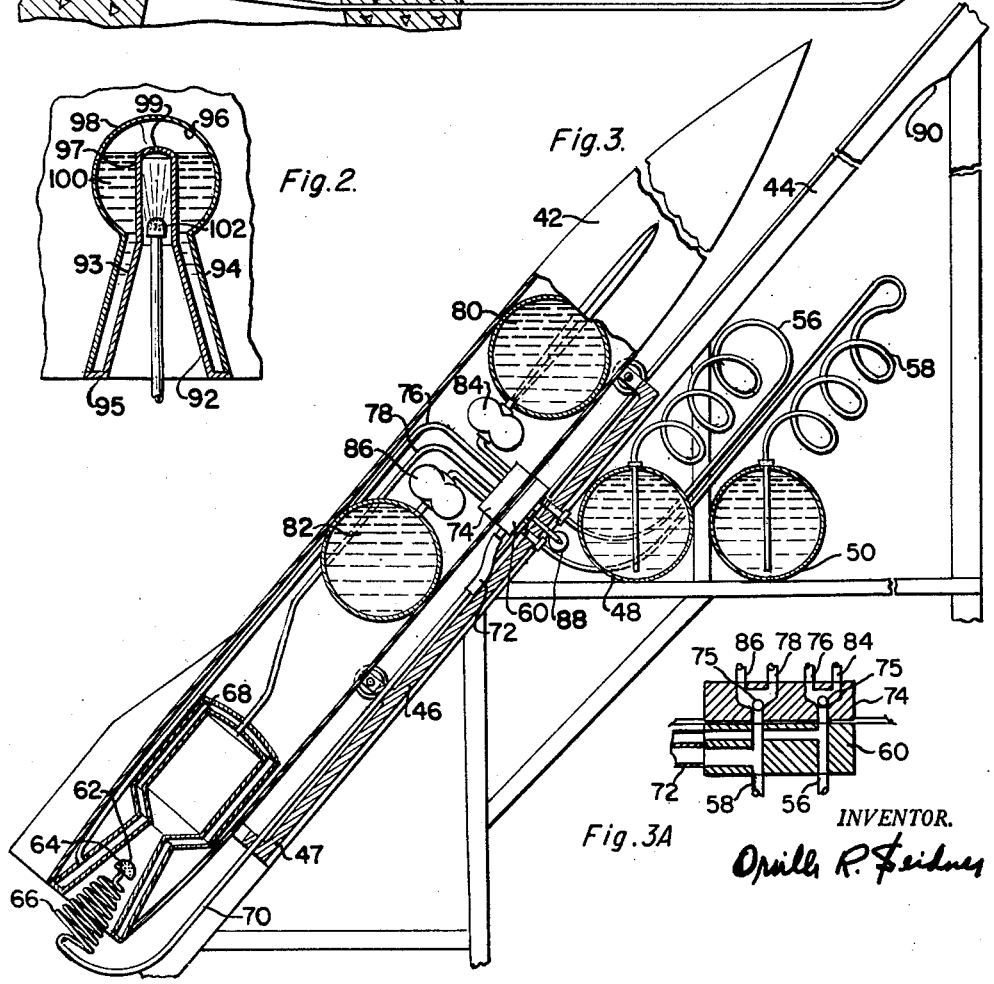
Fig. 3.
Fig. 3A
INVENTOR.
Orville R. Seidner Dec. 6, 1960     O. R. SEIDNER     2,962,934
VEHICLE PROPULSION APPARATUS
Filed June 13, 1955     2 Sheets-Sheet 2
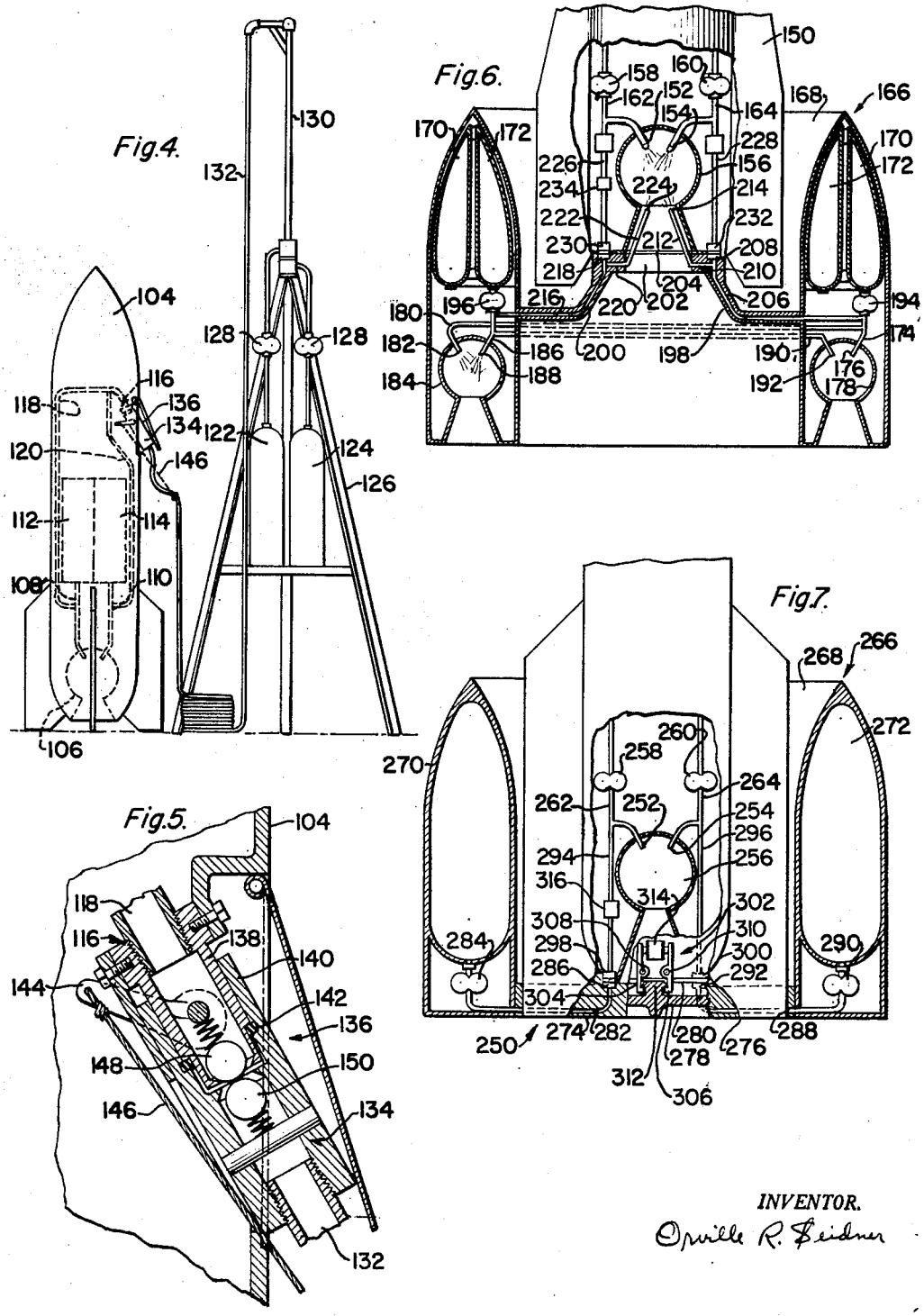
INVENTOR.
Orville R. Seidner United States Patent Office 2,962,934
Patented Dec. 6, 1960

2,962,934

VEHICLE PROPULSION APPARATUS

Orville R. Seidner, Alhambra, Calif., assignor to The Garrett Corporation, Los Angeles, Calif., a corporation of California Filed June 13, 1955, Ser. No. 515,183

9 Claims. (Cl. 89—1.7)

This invention relates to vehicle propulsion in general, and particularly relates to propulsion apparatus peculiarly adaptable to vehicles of the rocket type.

Rocket propulsion is divided into three broad phases; (1) getting the rocket off the ground and on its way, (2) accelerating the rocket through the dense atmosphere in the lower altitudes, and (3) propelling the rocket thereafter. Since the rocket customarily must carry its own fuel for all three phases, it is readily seen that the success of the third phase is governed almost solely by the economies effected in the first and second phases.

In the prior art it has been customary to provide liquid fuel and oxidant tanks within the rocket vehicle to supply the fuel nozzles in the motor thereof. Since a considerable portion of the fuel is consumed in the first and second phases above-mentioned, it is readily seen that any economies that can be effected in those phases will have beneficial effects on the range or payload of the rocket because the fuel thus saved is then available for the third and most important phase.

In order to effect such economies it has been proposed to add a booster or plurality of boosters (commonly known as rocket steps or booster stages) to the payload rocket to lift the payload and accelerate it through the dense air in the lower reaches of the atmosphere. For example, it is stated in Rockets, Missiles, and Space Travel, by Willy Ley, published by The Viking Press, in 1952, that the "WAC-Corporal" in solo flight (with a booster) attained an altitude of about 43.5 miles and the "V-2" rocket attained a solo altitude of 114 miles, but when the WAC-Corporal was staged by the V-2 it reached 250 miles altitude. Of particular note is the fact that the V-2 required about 4½ tons (dry weight) plus about 10 tons of fuel to stage the WAC-Corporal. Of the dry weight mentioned the rocket motor weighed one ton approximately.

Obviously, the dry weight of the booster step constitutes a penalty since it represents, in effect, a "deadhead passenger" taken along for the ride.

I have discovered means for decreasing the dry weight of the booster or auxiliary step of a rocket vehicle. I have also discovered means for providing starting assist to a single step rocket. Both discoveries are based upon the principle that a rocket motor is ignorant of and not particular about the source of the fuel fed to it, and that auxiliary means may be provided for furnishing external fuel either to the rocket motor nozzle or to nozzle means apart from the included motor nozzle to furnish thrust to the motor, hence to the rocket vehicle.

Therefore, the present invention is concerned with the first and second phases of rocket propulsion. Primarily, the invention has for its object the provision of methods and means for providing an auxiliary boost in the launching of a rocket whereby the fuel usually expended in getting the rocket off the ground is conserved for use in the later phases. Another object is to provide auxiliary assist propulsion apparatus which will allow conservation of the fuel in a rocket during the first and second phases of its flight. Other more specific objects will be apparent at once upon a consideration of the drawings when examined in the light of the description which follows.

Fig. 1 is an elevation view, partly schematic and partly in cross section, showing the tail section of a rocket resting on its launching or staging platform, one embodiment of the invention being shown in connection with the rocket motor;

Fig. 2 is a cross-sectional view of one form of rocket motor, showing a method of protecting the combustion chamber and throat of the motor;

Fig. 3 is an elevation view of another type of rocket and its launching or staging platform, two embodiments of the invention being shown;

Figure 3A is a view showing in somewhat schematic form the internal construction of the hose coupling 60 and coupling part 74 of Figure 3;

Fig. 4 is an elevation view of a free flight single step rocket provided with auxiliary fuel supply means for the initial phase of flight;

Fig. 5 is an enlarged cross-section fragmentary view of a fuel-line coupling employed with the rocket of Fig. 4;

Fig. 6 is an elevation view, partly in cross section, of another embodiment of the invention as applied to a free flight rocket; and Fig. 7 is an elevation view, partly in cross section, of yet another embodiment of the invention as applied to a free flight rocket.

Referring to Fig. 1, the tail section 10 of a rocket is shown as resting on a launching or staging platform 12 supported on the concrete apron 14 of the rocket launching site. For purposes of simplification of the description, the rocket is depicted as being provided with a single motor 16, although it will be apparent that a plurality of motors may be used, with any or all of them having the invention applied thereto.

The apron 14 is provided with an opening 18 which may lead to an underground exhaust muffling chamber (not shown) if desired. The table 12 is provided with a similar opening 20 through which the exhaust from the motor 16 may pass.

Extending up through the exhaust nozzle and into the combustion chamber of the motor 16 is a fuel nozzle 22 disposed on the end of a pipe 24 whose lower end has a connection with the three coils of a regenerative heat exchanger 26, the opposite ends of the coils being in communication with the tanks 28, 30, and 32 through the pumps 34, 36, and 38, respectively. Tank 28 contains fuel, tank 30 contains oxidant, and if the third tank 32 is employed in may contain water, or alcohol, for example, or any other fluid the use of which will enhance the thermodynamic reaction between the fuel and oxidant in the combustion chamber of the motor 16.

The motor 16, of course, is provided with the usual fixed fuel nozzles (not shown) having connections with the fuel and oxidant tanks (likewise not shown) in the rocket proper.

When it is desired to fire the rocket, the igniter 40 of the motor is energized, after which the pumps 34, 36, and 38 may be started to furnish fuel and oxidant (and water, if desired) to the nozzle 22. The firing of the externally supplied fuel and oxidant results in products of combustion whose thrust force is exerted on the rocket motor so as to give it a thrust. When the thrust exceeds the weight of the rocket, the rocket will move upwardly and leave the launching site. It goes without saying that the fuel and oxidant carried by the rocket must be turned on in order to sustain the flight of the rocket. If the internal rocket fuel is fed to the motor fuel nozzles while the external fuel is fed to the nozzle 22, it is apparent that the initial thrust will be increased by that much. In any event, it is apparent that the rocket fuel should be providing thrust to the rocket before the upward velocity of the rocket decreases too much.

In rocket motors an intense heat is generated in the combustion chamber by the burning fuel. It has been suggested that the combustion chamber, the throat, and the motor exhaust nozzle could be protected to some extent by providing a jacket around them to provide an intermediate space through which the fuel or oxidant could be conducted, in heat exchange, upstream from the fuel or oxidant nozzles. Patent No. 2,695,496 shows such a structure.

In the practice of the present invention, as depicted by Fig. 1, it is evident that no protective heat transfer will take place. Therefore, it is proposed, as shown in Fig. 2, to provide an expendable liner 92 within the exhaust nozzle 94 and the combustion chamber 96 of the motor 98. The liner 92 comprises a wall portion 93 shaped generally in the form of a frustum to conform to the configuration of the exhaust nozzle 94 of the motor 98. The annular flanged portion 95, extending radially from the larger open end of the frustum portion 93, is adapted to engage and form a seal with the inner wall of the exhaust nozzle 94 adjacent the lower end of the motor 98. The upper end of the wall 93 is substantially closed by a capped cylindrical portion 97 which extends upwardly from the smaller end of the frustum, the capped end being provided with an orifice 99 for equalization of pressures on each side of the liner 92. As shown, the cylindrical portion extends well into the combustion chamber 96 of the motor 98. The liner may be fabricated of lead, for example, or any other material which is readily disintegrated by the heat in the motor 98 when it is being fired.

The space 100 between the liner 92 and the inner walls of the motor 98 constitutes a jacketed chamber which may be nearly filled, for example, with water which will be converted to steam upon ignition of the fuel and oxidant issuing from the fuel nozzle 102. As the heat builds up in the combustion chamber the liner 92 melts or crumbles, according to the nature of the expendable material from which it is fabricated, with a portion of the heat being utilized to convert the water to steam and to melt the liner. In that manner the combustion chamber and throat are protected during the initial buildup of thrust from the combustion of the fuel.

In Fig. 3 there is shown a rocket 42 disposed on an inclined launching platform 44. An auxiliary staging structure or dolly 46 supports the rocket on the platform and provides a facile means for launching the rocket. Disposed on the platform are the fuel and oxidant tanks 48 and 50 which may be pressurized to deliver their contents through the flexible hosses 56 and 58 to a hose coupling 60 movably secured on the dolly 46.

Disposed on one end of a pipe 64, whose other end is coupled to the coils of a regenerative heat exchanger 66, is a nozzle 62 which extends into the exhaust nozzle of the rocket motor 68. The opposite end of the heat exchanger 66 is in communication with the coupling 60 by means of a pipe 70 and the flexible hose 72 through which fuel and oxidant are supplied from the tanks 48 and 50 to the nozzle 62. The pipe 70 may be suitably supported, and held rigidly for proper alignment of the nozzle 62 in the motor 68, by an extending arm 47 of the dolly 46. The movably secured coupling 60 has a connection with a mating coupling part 74 secured to the frame or hull of the rocket. Suitable outlets are provided, as shown more clearly in Figure 3A, in the coupling part 74 for the attachment thereto of the conduits 76 and 78 which serve as the main supply lines for fuel and oxidant to the fixed fuel nozzles in the motor 68.

Disposed within the rocket 42 are the fuel and oxidant tanks 80 and 82 having connections with the coupling part 74 through the pumps 84 and 86.

According to the invention, fuel and oxidant are supplied to the fixed fuel nozzles in the motor and the auxiliary external fuel nozzle 62 from the external tanks 48 and 50 until the rocket is well on its way up the ramp of the platform 44. When the dolly 46 reaches a predetermined point in its upward movement, the movable coupling element 60 is withdrawn from its connection with the part 74 by the action of the roller 88 on the cam surface 90 of the incline on the platform 44, at which time the fuel pumps 84 and 86 take over to supply fuel and oxidant to the fixed motor fuel nozzles from the rocket tanks 80 and 82. Thus the initial thrust is provided from fuel not carried by the rocket, and the initial thrust is the net of that provided not only by the fuel from the auxiliary fuel nozzle 62 but also that from the fuel supplied to the motor's fixed fuel nozzles from the external source.

It will be understood, of course, that suitable check valves 75 (see Figure 3A), are advantageously disposed in the coupling portion 74 so as to prevent the escape of fuel and oxidant from the tanks 80 and 82 after the movable coupling element 60 is withdrawn. Similarly shutoff valves (not shown) would be desirable for closing off the fuel and oxidant lines 56 and 58. The details of the coupling element and part 60 and 74 form no part of the present invention since it would be within the capabilities of those skilled in the coupling art to design the simple structure called for herein. The actual details might bear similarity to those shown in Fig. 5, if desired.

In Fig. 4 there is shown a free flight rocket in which the fuel for the initial acceleration is provided by an external source. The rocket 104 is shown as comprising a rocket motor 106 arranged to be fed with fuel and oxidant through the pipes 108 and 110 from the internal tanks 112 and 114, the motor, pipes, and tanks being indicated by dashed lines. The rocket is further comprised of a coupling member 116 communicating by means of pipes 118 and 120 (likewise shown in dashed lines) with the motor 106. It is now seen that the motor 106 is adapted to be provided with fuel and oxidant from the coupling 116 or from the tanks 112 and 114.

The external source of fuel and oxidant for the initial acceleration of the rocket is shown as comprising the tanks 122 and 124 mounted on the frame structure 126, the tanks being arranged to feed their contents by way of the pumps 128 and 128, the stand pipe 130, the umbilical hose 132, and the coupling member 134 to the mating coupling member 116, and thence to the motor 106 by way of the pipes 118, 120, and 108, 110. It will be appreciated that suitable check valves may be provided in the pipes 108 and 110 adjacent the tanks 112 and 114 in order that the pressure in the supply lines will not back up into the tanks and burst them when fuel and oxidant are supplied from the external sources. The umbilical hose 32 is preferably a pair of hoses coupled side by side (only one being shown), one for fuel and one for oxidant.

Although the specific details of the coupling device 136, comprising the members 116 and 134, form no part of the present invention, it is desired to point out that the coupling device must be provided with "breakaway" features of the type which will permit rapid and easy disconnect of member 134 from member 116. That is, in the practise of the invention, the rocket 104 will be fired in the usual manner but with fuel and oxidant supplied from the external tanks 122 and 124 until the rocket has reached such a height that it is necessary or desirable that the hose 132 be disconnected.

One such type of quick disconnect is disclosed in Patent No. 2,533,640 and shown here in a general way in Fig. 5. The coupling member 116 comprises a male nipple 138 secured to the hull of the rocket and disposed at an acute angle to the vertical axis thereof. The member 134 comprises a mating female body 140 adapted to have a sliding fit with the nipple 138 and to be secured thereto with the gasket seal 142 interposed, as shown. The securing means is adequately shown and described in the aforesaid Patent No. 2,533,640 and need not be repeated herein. The securing means includes a locking and unlocking lever 144 arranged to be locked manually in the position shown and to be unlocked, for quick disconnect, by a pull on the cord 146. The distal end of the cord may be connected to the hose 132 with the parts so arranged that a predetermined pull, occasioned by the increasing weight of the hose with increasing height of the rocket, will cause the handle 144 to be drawn downwardly, thereby effecting disconnect between the members 116 and 134.

It will be appreciated that disconnect provision must be made for both fuel and oxidant, since these two liquids are obviously not carried within a single conduit. Therefore, it is contemplated that the coupling device 136 will, in reality, comprise a pair of adjacent couplers, each including a male nipple and female body, and each being releasable by concurrent unlocking actuation.

A feature of the coupling is the ball check 148 which prevents fuel from being pumped back through the pipe 118, for example, and the ball check 150 which closes off the external supply when the disconnect is accomplished.

Figs. 6 and 7 show distinctly different embodiments of the invention applied to auxiliary staging structures adapted to accompany the rocket vehicle during the first two phases of its flight. It is a feature of both these embodiments that propulsion of the rocket is accomplished primarily by thrust generated in its own motor, the fuel for the first and second phases being supplied from the tanks in the auxiliary staging structure. The embodiment of Fig. 6 includes rocket motors in the auxiliary staging structure for the preferred purpose of merely causing the structure to accompany the rocket until the external fuel tanks are exhausted. With that type of construction, the auxiliary motors need not be as large and heavy as would be the case if they were to contribute any substantial thrust to the rocket. In the embodiment of Fig. 7 the main rocket motor is utilized for all thrust purposes, including that of lifting the auxiliary staging booster and causing it to accompany the rocket until the external tanks are empty.

Referring now to Fig. 6. there is shown the lower motor section 150 of a rocket adapted to have the fuel and oxidant nozzles 152 and 154 of its motor 156 fed by pumps 158 and 160 through the pipes 162 and 164 from the tanks in the rocket (not shown). An auxiliary staging structure 166 comprises an annular shell 168 enclosing a pair of annular tanks 170 and 172 which are adapted to constitute the external source of fuel and oxidant. Preferably, the tanks are paired as shown and extend completely around and within the nose of the shell 168. Such an arrangement provides proper correlation (with respect to the axis of the rocket) between the probable different quantities of fuel and oxidant carried and between their differing rates of consumption in flight.

Tank 170 has a connection by means of the pipe 174 with the nozzle 176 in the rocket motor 178, and a connection by means of the pipe 180 with the nozzle 182 in the rocket motor 184. Similarly, the tank 172 has a connection by means of the pipe 186 with the nozzle 188 in the motor 184, and a connection by way of the pipe 190 with the nozzle 192 in the motor 178. Pumps 194 and 196 are arranged to feed the fuel and oxidant from the tanks 170 and 172 to the pipes 174, 180 and pipes 186, 190.

Extending inwardly from the shell 168 are a pair of arms or struts 198 and 200 provided at their inner ends with an annulus 202 arranged to abut the end surface 204 of the rocket section 150. Arm 198 is provided with a passageway 206 which communicates at one end with the pump 194 and at the other end with a coupling element 208. The passageway 206 has a lateral branch 210 to the end of which is secured the pipe 212 which feeds a fluid nozzle 214 extending within the exhaust nozzle of the motor 156.

Arm 200 is provided with a passageway 216 which communicates at one end with the pump 196 and at the other end with a coupling element 218. The passageway 216 has a lateral branch 220 to the end of which is secured the pipe 222 which feeds a fluid nozzle 224 extending within the exhaust nozzle of the motor 156.

Arranged within the rocket are the pipes 226 and 228 providing communication between the rocket motor fuel and oxidant nozzles 152, 154 and the coupling elements 218, 208 by way of the mating coupling elements 230, 232 which are secured in the base of the motor section 150 adjacent the end surface 204.

The paired coupling elements 218, 230 and 208, 232 may be of similar construction to those shown at 138, 140 in Fig. 5, or of any other preferred type. Here again, the details of the manner of coupling the fuel lines of the auxiliary staging structure to the fluid nozzle lines in the rocket form no part of the present invention since the design probably would be of the simplest type well within the capabilities of the skilled artisan.

As mentioned above in connection with the other embodiments, shutoff or check valves of suitable type are contemplated for the various fluid lines to prevent undue pressure on the lightweight tanks in the rocket and to prevent fuel and oxidant from being pumped overboard when the rocket steps part. One innovation might be a pressure sensitive switch 234 arranged to activate the pumps 158, 160 upon cessation of pressure in pipe 226 upon exhaustion of auxiliary tank 172. All other details of pipes, valves, and plumbing are clearly within the skill of the rocket artisan.

It is now seen that the external source of fuel and oxidant in the tanks 170 and 172 is available at the nozzles 152, 154, 214, and 224 for thrust in the main rocket motor 156, and at the nozzles 176, 192, 182, and 188 for thrust in the auxiliary motors 178 and 184. It will be understood, of course, that while there is shown a pair of auxiliary motors 178 and 184, any number may be employed.

In Fig. 7 there is depicted a structure similar in many respects to that of Fig. 6. The lower motor section 250 of the rocket is adapted to have the fuel and oxidant nozzles 252 and 254 of its motor 256 fed by the pumps 258 and 260 through the pipes 262 and 264 from the tanks in the rocket (not shown). An auxiliary staging structure 266 comprises an annular shell 268 enclosing a pair of tanks 270 and 272. In the construction shown the tanks would be semi-annular, i.e. each would extend approximately half way around within the shell 268. The construction is not critical, and the tanks could be annular, if desired, after the manner shown in Fig. 6.

Extending inwardly from the shell 268 (and disposed intermediate the rocket fins) are a pair of arms or struts 274 and 276 joined at their inner ends by a ring or annulus 278 arranged to abut the end surface 280 of the rocket section 250. Arm 274 is provided with a passageway 282 which communicates at one end with the pump 284 and at the other end with a coupling element 286. Arm 276 is provided with a passageway 288 which communicates at one end with the pump 290 and at the other end with a coupling element 292.

Arranged within the rocket are the pipes 294 and 296 providing communication between the rocket motor fuel and oxidant nozzles 252, 254 and the coupling elements 286, 292 by way of the mating coupling elements 298, 300 which are secured in the base of the motor section 250 adjacent the end surface 280. The paired coupling elements 286, 298 and 292, 300 are similar to those described above in connection with Fig. 6 and need not be further detailed here.

The staging structure 266 is arranged to accompany the rocket. To this end a plurality of releasable latches, one being shown at 302, are arranged around the base of the motor section and the annulus 278 intermediate the struts 274 and 276. For the purpose of illustration only, the latch 302 is shown as comprising a pair of dogs 304 and 306 pivotally secured to the motor section 250 by means of the pins 308 and 310, respectively. The latching ends of the dogs are arranged to engage the outwardly extending shoulders of the annulus portion 312 which extends upwardly from the annulus 278. Unlatching action of the dogs is accomplished by the solenoid 314 which, when energized, causes the dog members to pivot about the pins 308 and 310 whereupon the latching ends of the dogs are disengaged from the outwardly extending shoulders of the annulus portion 312.

Means for energizing the solenoid 314 to accomplish the aforementioned unlatching action may include a pressure sensitive switch 316 subject to the pressure in the auxiliary fluid feed pipe 294. Thus, when the fluid in the tank 270 is exhausted, the lowered pressure in the conduit 294 actuates the switch 316 to close an electrical circuit and thereby energize the solenoid 314. The electrical circuit forms no part of the present invention since it could be easily devised by a skilled technician.

It will be appreciated, of course, that the latch details may be changed according to any preferred design, and that the form shown is merely for the purpose of illustration, as aforementioned.

In the practise of the embodiments shown in Figs. 6 and 7, the rocket is fired in the usual manner but with fuel and oxidant being supplied from the external tanks in the auxiliary staging structures. When the fluid is exhausted in the external tanks, the pressure switches in the auxiliary feed lines are actuated to close their respective circuits. In both cases, the pressure switches may be arranged to energize the main fuel pumps in the rocket. Additionally, the pressure switch 316 in Fig. 7 energizes the solenoid 314 to unlatch the auxiliary staging booster from the rocket.

It will now be seen that the invention comprises, in its broadest general aspects, means for providing an external source of liquid fuel and oxidant for the propulsion of a vehicle. Additionally, novel means for introducing the fuel and oxidant to the thrust region of a rocket motor have been disclosed in the various embodiments without any intent to limit the invention to the mere details which have been described.

I claim:

1. A method of initially accelerating from rest a rocket vehicle having a thrust producing rocket motor comprising the steps of introducing propulsive fuel from a ground supported substantially stationary source into said rocket motor while at rest, combusting said fuel in said rocket motor to apply thrust to the rocket vehicle, continuing to introduce and combust said ground supported propulsive fuel within said rocket motor until after initial acceleration of said vehicle from rest, thereafter discontinuing introduction of said ground supported propulsive fuel into said rocket motor, and initiating introduction into said rocket motor and combustion within said rocket motor of rocket vehicle carried propulsive fuel before substantial diminishment of the initial movement of said vehicle from rest.

2. A method of initially accelerating from rest a rocket vehicle provided with a thrust producing rocket motor having a combustion chamber and a duct exhausting therefrom comprising the steps of introducing propulsive fuel through said duct from a ground supported substantially stationary source into said rocket motor while at rest, combusting said fuel in said rocket motor to apply thrust to the rocket vehicle by exhaust through said duct, continuing to introduce and combust said ground supported propulsive fuel within said rocket motor until after initial acceleration of said vehicle from rest, thereafter discontinuing introduction of said ground supported propulsive fuel through said duct into said rocket motor, and initiating introduction into said rocket motor and combustion within said rocket motor of rocket vehicle carried propulsive fuel before substantial diminishment of the initial movement of said vehicle from rest.

3. A method of initially accelerating from rest a rocket vehicle provided with a thrust producing rocket motor having a combustion chamber and nozzle means for introducing propulsive fuel thereinto comprising the steps of introducing propulsive fuel through said nozzle means from a ground supported substantially stationary source into said combustion chamber while said rocket vehicle is at rest, combusting said fuel in said combustion chamber to apply thrust to the rocket vehicle, continuing to introduce and combust said ground supported propulsive fuel within said rocket motor until after initial acceleration of said vehicle from rest, thereafter discontinuing introduction of said ground supported propulsive fuel into said combustion chamber through said nozzle means, and initiating introduction through said nozzle means and combustion within said combustion chamber of rocket vehicle carried propulsive fuel before substantial diminishment of the initial movement of said vehicle from rest.

4. Propulsion apparatus for applying an initial thrust to a rocket vehicle provided with a thrust producing rocket motor having a combustion chamber and a duct exhausting therefrom comprising a support providing a supporting surface for the rocket vehicle during launching, a ground supported substantially stationary source of fuel, means for conducting fuel from said source to the rocket vehicle for combustion in the rocket motor to exhaust through the duct of the rocket motor and thereby apply thrust to the motor and vehicle when positioned for launching on said supporting surface, said fuel conducting means including conduit means having releasable coupling means at the end thereof, said coupling means being connectible to the rocket vehicle to supply said fuel to the rocket motor thereof, and means cooperating with said coupling means to detach said coupling means from the rocket vehicle and terminate the conducting of said fuel to the rocket motor upon the rocket vehicle initially accelerating from its rest position on said supporting surface whereby further acceleration and propulsion of the vehicle may be effected solely by combustion of rocket vehicle carried fuel within the rocket motor.

5. Propulsion apparatus as recited in claim 4 wherein said fuel conducting means further includes duct means having burner nozzle means at the end thereof, said duct means being mounted relative to said support to extend into the duct of the rocket motor when the rocket vehicle is positioned on said supporting surface such that initial acceleration of the rocket vehicle from rest position on said supporting surface effects separation of said duct means and burner nozzle means from the rocket motor.

6. Propulsion apparatus as recited in claim 5 wherein said duct means includes regenerative heat exchange means adjacent the region of exhaust through the duct of the rocket motor for heat transfer from the products of combustion to the fuel flowing in said duct means.

7. Propulsion apparatus for applying initial thrust to a rocket vehicle provided with a thrust producing rocket motor having a combustion chamber and a duct exhausting therefrom comprising an auxiliary staging structure for supporting the vehicle including guide means inclined generally upwardly at least at one terminal thereof, dolly means movable along said guide means for riding with the vehicle during at least a portion of the vehicle's movement along said guide means upon launching, a ground supported substantially stationary source of fuel, means for conducting fuel from said source to the rocket vehicle for combustion in the rocket motor to exhaust through the duct of the rocket motor and thereby apply thrust to the motor and vehicle when positioned for launching on said staging structure, said fuel conducting means including conduit means having releasable coupling means at the end thereof, said coupling means being connectable to the rocket to supply said fuel to the rocket motor thereof, and means on said staging structure cooperating with said coupling means to detach said coupling means from the rocket vehicle and terminate the conducting of said fuel to the rocket motor upon the rocket vehicle and dolly moving along at least a portion of said guide means whereby further acceleration and propulsion of the vehicle may be effected solely by combustion of rocket carried vehicle fuel within the rocket motor.

8. Propulsion apparatus as recited in claim 7 wherein said fuel conducting means further includes duct means having burner nozzle means at the end thereof, said duct means being mounted relative to said auxiliary staging structure to extend into the duct of the rocket motor when the rocket vehicle is positioned on said structure such that acceleration of the rocket vehicle along said guide means effects separation of said duct means and burner nozzle means from the rocket motor.

9. Propulsion apparatus for a rocket vehicle comprising a rocket vehicle provided with vehicle carried fuel and a thrust producing rocket motor having a combustion chamber and a duct exhausting therefrom, a support providing a supporting surface with the rocket vehicle mounted thereon for launching, a ground supported substantially stationary source of fuel, means for conducting fuel from said source to said rocket vehicle for combustion in said rocket motor to exhaust through the duct of the rocket motor and vehicle, said fuel conducting means including conduit means having releasable coupling means at the end thereof, said coupling means being connected to said rocket vehicle to supply fuel from said stationary source to the rocket motor thereof, and means cooperating with said coupling means to detach said coupling means from the rocket vehicle and terminate the conducting of fuel from said source to the rocket motor upon said rocket vehicle initially accelerating from its rest position from said ground supported fuel source whereby further acceleration and propulsion of the vehicle may be effected solely by combustion of vehicle carried fuel within said rocket motor.

References Cited in the file of this patent

UNITED STATES PATENTS

| | | |
|---|---|---|
| 1,746,996 | Fairhill | Feb. 11, 1930 |
| 2,421,522 | Pope | June 3, 1947 |
| 2,674,088 | Riedel et al. | Apr. 6, 1954 |
| 2,686,473 | Vogel | Aug. 17, 1954 |
| 2,695,496 | Goddard | Nov. 30, 1954 |
| 2,726,510 | Goddard | Dec. 13, 1955 |
| 2,734,702 | Northdrop et al. | Feb. 14, 1956 |
| 2,745,347 | Lightbody et al. | May 15, 1956 |
| 2,777,655 | Graham | Jan. 15, 1957 |
| 2,787,218 | Anthony | Apr. 2, 1957 |

OTHER REFERENCES

The Launching of Guided Missiles, Coast Artillery Journal, March-April 1947 (pp. 15–21).

Rockets, by Willey Ley, Scientific American, vol. 180, No. 5, May 1949 (pp. 30–39).